(No Model.)
A. G. MACK.
FISH HOOK.
No. 454,581.                                   Patented June 23, 1891.
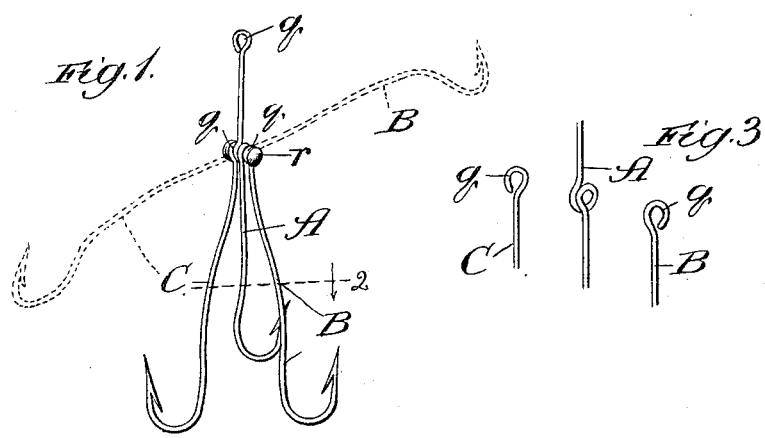
Witnesses:
Chas. E. Gaylord,
J. W. Dyrenforth,
Inventor:
Albert G. Mack,
By Dyrenforth & Dyrenforth.
Attys.
THE NORRIS PETERS CO., PHOTO-LITHO., WASHINGTON, D. C.

UNITED STATES PATENT OFFICE.

ALBERT G. MACK, OF ROCHESTER, NEW YORK, ASSIGNOR OF ONE-HALF TO CHARLES E. FELTON, OF CHICAGO, ILLINOIS.

FISH-HOOK.

SPECIFICATION forming part of Letters Patent No. 454,581, dated June 23, 1891.

Application filed February 18, 1891. Serial No. 381,834. (No model.)

*To all whom it may concern:*

Be it known that I, ALBERT G. MACK, a citizen of the United States, residing at Rochester, in the county of Monroe and State of New York, have invented a new and useful Improvement in Fish-Hooks, of which the following is a specification.

The primary object of my improvement is to prevent minnows and the like, used as bait, from being "lost" or stolen by the fish biting or pulling the bait off at the projecting head or tail and then escaping. To this end I provide hooks on opposite sides of the bait-hook extending normally, as their operative position, beyond (below) the latter, and preferably with their points protected in a manner to cause the fish to be hooked in whatever direction it makes the attack upon the bait; and to facilitate the adjustment of the bait on the bait-hook I render the flanking-hooks adjustable to raise them with relation to the bait-hook for permitting the latter to be got at the more conveniently for the purpose.

In the accompanying drawings, Figure 1 is a view in elevation of one form of my improved device, the side hooks being represented in Fig. 1 by dotted lines as raised for convenience of access to the center hook. Fig. 2 is a section taken on the line 2 of Fig. 1 and viewed in the direction of the arrow, showing the preferred relative normal positions of the hooks. Fig. 3 is a diagram showing the upper ends of the shank portions of the three hooks.

A is a fish-hook of ordinary or any suitable construction.

B and C are fish-hooks connected with the fish-hook A to extend at opposite sides of or flank the latter. The means of connection between the three hooks, according to the construction represented in Fig. 1, comprises a shaft or axis *r*, to which the shank of the hook A is fastened, as by bending it around the axis in the manner indicated in Fig. 3, whereby the loop *q* extends beyond the axis, and to which the hooks B and C are pivotally applied at their eyes *q* to flank the center or bait hook A, being held in place by upsetting the ends of the shaft *r* or otherwise. The hooks B and C, which project normally below the hook A, are preferably adjusted to extend with their curved and pointed portions in contrary directions, and the last-named portions should be bent laterally outward to present the points to a fish whatever the direction of attack of the latter, and thus tend to insure hooking thereof.

The bait (minnow or other bait) is applied to the center hook A, and to facilitate such application the lateral hooks are turned on their axis *r* in opposite directions to or toward the positions indicated by the dotted representation in Fig. 1, thereby raising them and rendering the hook A readily and conveniently accessible for baiting. When the bait has been adjusted, the side hooks are brought together, as shown by the full lines representing them in Fig. 1. It will be noticed that the shank portions of the hooks B and C are bowed outward. This is done to cause them the better to conform to and retain the body of the minnow or fish used as bait.

What I claim as new, and desire to secure by Letters Patent, is—

1. In combination, a center hook for the bait and side hooks normally extending below the bait-hook and adjustable to their normal positions and from the latter to remove them from obstructing the bait-hook, all the hooks being on a common transverse axis, substantially as and for the purpose set forth.

2. In combination, a center hook for the bait and side hooks adjustable to their normal positions and from the latter to remove them from obstructing the bait-hook, the side hooks extending at their curved barbed portions normally below the bait-hook and in different directions, and all the hooks being on a common transverse axis, substantially as and for the purpose set forth.

3. In combination, a center hook for the bait and side hooks bowed outward at their shank portions and adjustable to their normal positions and from the latter to remove them from obstructing the bait-hook, substantially as and for the purpose set forth.

4. In combination, a center hook A for the bait and side hooks B C, all on a common transverse axis *r*, upon which the side hooks are adjustable with relation to the hook A, the side hooks extending normally below the bait-hook, substantially as and for the purpose set forth.

5. In combination, a center hook A for the bait and side hooks B C, all on a common transverse axis $r$, upon which the side hooks are adjustable with relation to the center hook, the side hooks extending at their curved and barbed portions normally below the bait-hook and in contrary directions and having the said portions bent outward, substantially as and for the purpose set forth.

6. In combination with an axis $r$, a hook A, bent at its shank portion around the axis, and hooks B and C, hung at their loops $q$ on the axis at opposite sides of the hook A, bowed at their shank portions, and having their curved barbed portions bent outward, substantially as and for the purpose set forth.

ALBERT G. MACK.

In presence of—
LESTER G. FISHER,
VICTOR KNAPP.